Sept. 8, 1970  R. J. MISTARZ  3,527,314

POWER DRIVEN VEHICLE ARRANGED FOR HAND PROPELLING

Filed May 10, 1968

INVENTOR
ROBERT J. MISTARZ

BY Hofgren, Wegner, Allen
Stellman & McCord.

ATTORNEYS.

United States Patent Office 3,527,314
Patented Sept. 8, 1970

3,527,314
POWER DRIVEN VEHICLE ARRANGED FOR HAND PROPELLING
Robert J. Mistarz, Northbrook, Ill., assignor to Chicago Stainless Equipment, a corporation of Illinois
Filed May 10, 1968, Ser. No. 728,289
Int. Cl. B62d 51/04
U.S. Cl. 180—19                                    1 Claim

ABSTRACT OF THE DISCLOSURE

A power driven vehicle such as a golf cart that may also be hand propelled including a power driving means on the frame of the vehicle having a rotatable member, for example a sprocket wheel, a removable member extending between and interconnecting the rotatable member and one wheel of the vehicle for transferring driving power to this one wheel and means on the removable member for disengaging it from both the rotatable member and one wheel when the vehicle is being hand propelled so that the power driving means will not create a drag on the supporting wheels.

---

One of the features of this invention is to provide in a power driven vehicle that may also be hand propelled, particularly when the power driving means fails, a simple removable member for connecting a portion of the power driving means and one wheel of the vehicle for driving the same but which when removed permits the vehicle to be hand propelled without drag from the power driving means.

Other features and advantages of the invention will be apparent from the following description of one embodiment thereof an shown in the accompanying drawings. Of the drawings.

Figure 1:
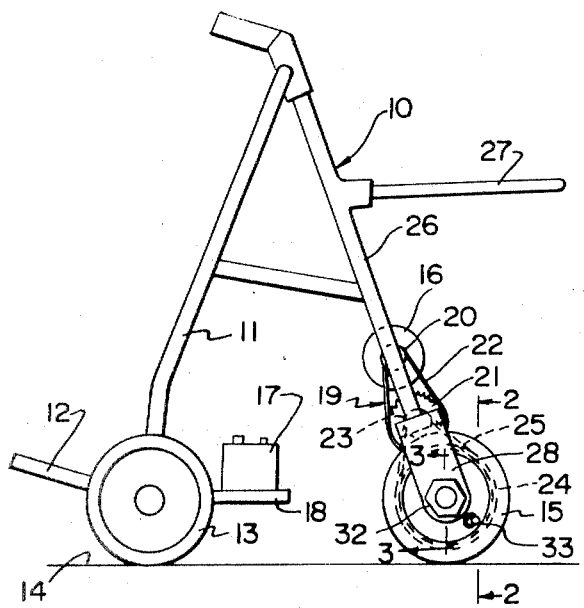
FIG. 1 is a side elevational view of a golf cart embodying the invention.

The power driven vehicle that may also be hand propelled disclosed in the accompanying drawings is a golf cart 10 that comprises a frame 11 including a golf bag (not shown) support 12 and a plurality of supporting wheels 13 for movably supporting the cart on a surface such as the ground 14.

One 15 of the supporting wheels is normally power driven by power driving means mounted on the frame which in the illustrated embodiment comprises an electric motor 16, a rechargeable battery 17 mounted on a platform 18 on the frame and gearing 19 for transferring power from the motor 16 to the one power driven wheel 15.

Figure 2:
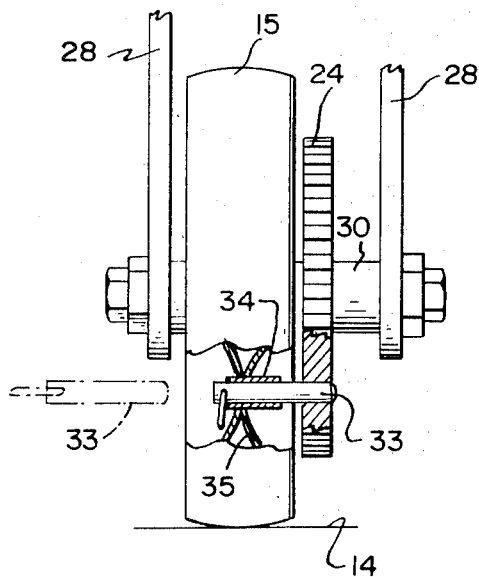
FIG. 2 is an enlarged fragmentary sectional view taken substantially along line 2—2 of FIG. 1.

In the illustrated embodiment this gearing comprises a small gear wheel 20 driven directly by the shaft of the motor 16, a larger gear wheel 21 driven from the small wheel 20 by a conventional ridged rubber belt 22, a small sprocket wheel 23 driven from the larger gear wheel 21 and a larger sprocket wheel 24 driven by means of a chain 25 from the sprocket wheel 23. For clarity of illustration the chain 25 is shown in FIG. 1 but is omitted from FIGS. 2 and 3.

The frame 11 comprises a front frame member 26 on which is mounted a forwardly extending, axially rotatable speed control rod 27 for controlling the power supply from the battery 17 to the motor 16. At the bottom of the front frame member 26 there are provided a pair of substantially parallel side mounting bars 28 between which are located the driven wheel 15 and the sprocket wheel 24 which of course is one of the rotatable members of the power driving means. The wheels 15 and 24 are rotatably mounted on a common transverse axle 29 extending between the mounting bars 28. Between one bar 28 and the adjacent sprocket wheel 24 there is positioned a spacing collar 30, a similar collar 31 is between the other mounting bar 28 and driven wheel 15.

Figure 3:
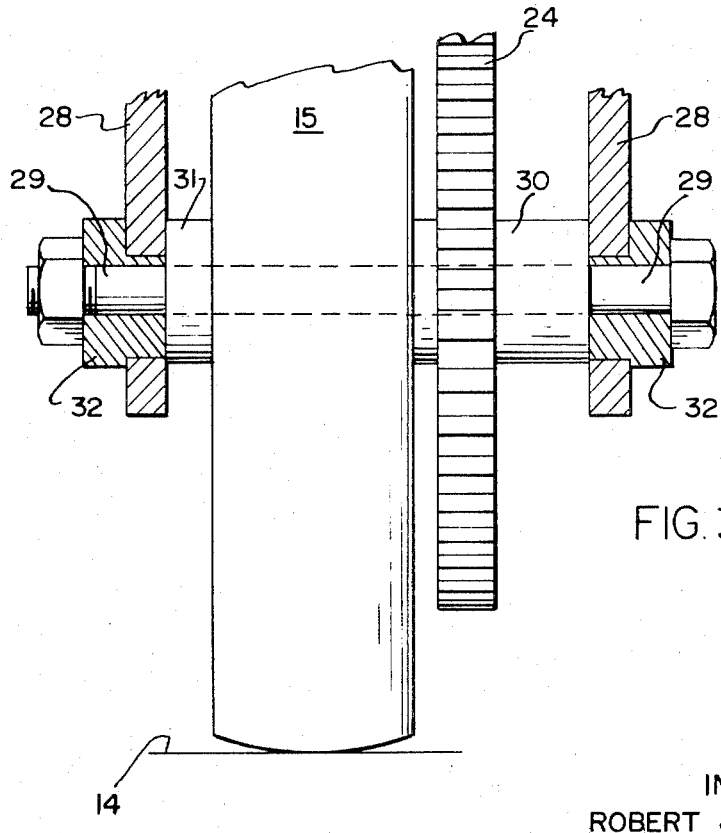
FIG. 3 is an enlarged fragmentary sectional view taken substantially along line 3—3 of FIG. 1.

In order to adjust the spacing between the larger sprocket wheel 24 and the smaller sprocket wheel 20 and thereby the tension on the sprocket chain 25 there are provided a pair of rotatable adjusting cams 32 each held within an opening in a mounting bar 28 and through which extends the common axle 29. As can be seen in FIG. 3, when the adjusting cams 32 are turned the axle 29 and thus the driven wheel 15 and driving sprocket 24 mounted thereon are adjusted in position relative to the power source.

In the event of power failure or for any similar reason, the invention permits hand propelling the cart without being encumbered by the drag of the gearing 19. This is accomplished by providing a removable member here embodied in a pin 33 extending between and interconnecting the rotatable sprocket wheel 24 of the gearing 19 and the power driven wheel 15. In the illustrated embodiment this pin is normally held in an elongated sleeve 34 which may be positioned either in the rotatable member wheel 24 or the support wheel 15 with the pin being longitudinally slidable in the sleeve 34. The pin removable member 33 has means thereon for withdrawing the pin as illustrated by the broken line position in FIG. 2 from engagement with both the driven supporting wheel 15 and the sprocket wheel 24. When this is done the driven wheel 15 is completely separated from the gearing 19 so that the cart can be easily moved over the ground 14 or other supporting surface by hand. Then to reconnect the parts for power driven movement of the cart it is only necessary to reinsert the pin 33 to the position shown in FIG. 2.

The elongated sleeve 34 which retains the connecting pin 33, and the pin 33 in driving position in the sleeve, are generally at right angles to the rotatable member or sprocket wheel 24.

As can be seen from the above description of the invention and one embodiment thereof, the invention provides simple yet reliable means for interconnecting the power drive to the driven wheel when the vehicle or cart 10 is power driven over the supporting surface 14. When, however, it is desired to move the cart by hand it is only necessary to withdraw the connecting pin 33 whereupon the driven supporting wheel 15 is freely rotatable like the other wheels 13. In one specific embodiment there were two spaced wheels 13 and a single driven wheel 15 on the cart 10.

Having described my invention as related to the embodiment shown in the accompanying drawings, it is my intention that the invention be not limited by any of the details of description, unless otherwise specified.

I claim:

1. A power driven vehicle that may also be hand propelled, comprising: a frame; support wheels for said frame; power driving means on said frame for driving at least one said wheel and thus said vehicle, said power driving means having a rotatable member and comprising a power source and gearing driven thereby in which said rotatable member is a part of said gearing and comprises a sprocket wheel; a removable member comprising a completely removable pin extending between and interconnecting the rotatable member of said power driving means and said one wheel for transferring driving power to said one wheel; means on said removable member for disengaging it completely from both said rotatable member and one wheel when said vehicle in being hand propelled, at least one of said rotatable member and one wheel being provided with an elongated force transmitting sleeve in which said pin is located during said engaging and is longitudinally slidable during said disengaging, said one wheel and said sprocket wheel being both mounted for rotation on an axle; and cam means for adjusting the relative position of said axle and sprocket wheel to said power source.

References Cited

UNITED STATES PATENTS

| | | | |
|---|---|---|---|
| 2,015,218 | 9/1935 | Dufour | 180—19 |
| 2,760,589 | 8/1956 | Rudman | 180—19 |
| 2,879,858 | 3/1959 | Thomas | 180—19 |
| 3,251,630 | 5/1966 | Asteley | 301—1 |

BENJAMIN HERSH, Primary Examiner

J. A. PEKAR, Assistant Examiner